United States Patent Office

3,594,482

Patented July 20, 1971

3,594,482

METHOD OF TREATING A PATHOLOGICAL FIBRINOLYTIC STATE IN MAMMALS

Larry J. Loeffler, North Wales, Pa., assignor to Merck & Co., Inc., Rahway, N.J.

No Drawing. Original application Feb. 28, 1968, Ser. No. 708,769, now Patent No. 3,526,657, dated Sept. 1, 1970. Divided and this application July 28, 1969, Ser. No. 872,786

Int. Cl. A61k *27/00*

U.S. Cl. 424—319 1 Claim

ABSTRACT OF THE DISCLOSURE

The method of treating a pathological fibrinolytic state in mammals which involves the daily oral administration of from 1 to 20 mg./kg. of body weight of the compound:

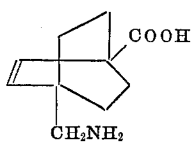

This application is a division of U.S. Ser. No. 708,769 filed Feb. 28, 1968 and now U.S. Pat. No. 3,526,657.

This invention relates to new anti-fibrinolytic compounds and to a method of counteracting certain hemorrhagic conditions and other disorders resulting from a pathological fibrinolytic state in patients. More specifically, this invention relates to the new compound 4-aminomethylbicyclo[2.2.2]oct - 2 - ene - 1 - carboxylic acid, having the structure:

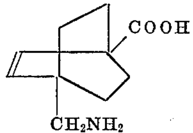

This compound is useful in the prevention or treatment of a pathological fibrinolytic state in mammals including persons and animals, by the oral administration of from 1 to 20 and preferably 2 to 8 mg./kg. of body weight per day of the above compound for varying periods of treatment.

The dissolution of fibrin deposits in mammals is due to their lysis by the enzyme plasmin (fibrinolysin) which is formed in the blood from plasminogen, also present in the blood. This conversion from plasminogen to plasmin is promoted by activators in the blood and it would appear that excessive fibrinolytic activity results from an over-abundance of such activators. When too much plasmin is present, the clotting system of the blood becomes unbalanced, viable clots cannot be maintained, and hemorrhage may result. This situation is known as a fibrinolytic state. Other enzyme systems (i.e., the kallikreins, complement) may also be activated in an undesirable manner when such a state exists.

An interest has recently developed in antifibrinolytic agents, i.e. drugs which will inhibit the activation of plasminogen to form plasmin. These antifibrinolytic agents are believed to interfere with the function of the activators of converting plasminogen to plasmin. The clinical uses of such drugs include their administration to persons undergoing various kinds of surgery (such as heart-lung and prostate surgery), obstetrical hemorrhage problems, menorrhagia, and many other uses which have been suggested in the literature (e.g. see Nilssen, Acta Medica Scand. Suppl. 448, volume 180, 1966).

A standard anti-fibrinolytic agent, against which newer ones are generally tested and compared is epsilon aminocaproic acid, known as EACA. One deficiency of this agent has been the very high dosages needed; in some cases 3–6 grams or more every 4 to 6 hours. Also, side effects such as dizziness, nausea and diarrhea have been observed. More recently, two more potent agents have been described, namely trans - 4 - aminomethylcyclohexane carboxylic acid (AMCHA) and 4 - aminomethylbenzoic acid (PAMBA). Each is reported to be more active than EACA by both in vitro and in vivo tests (e.g. see Anderssen et al. Scand. J. Haemat. (1965) 2 230 and Melander et al. Acta Pharmacol. et Toxicol. (1965) 22 340, both of which discuss (AMCHA).

I have found that the above compound shows activity of about 30 times that of EACA in in vitro tests essentially the same as those known to correlate with human clinical results. I have thus also found an improved antifibrinolytic method of therapeutic treatment requiring much smaller doses of the drug.

The compound of this invention is prepared by starting with the known compound, methyl - 4 - carboxamidobicyclo[2.2.2]oct - 2 - ene - 1 - carboxylate. It is prepared essentially as described by F. W. Baker and L. M. Stock. J. Org. Chem., 32, 3344, (1967). These authors reported a melting point of 154–156° C. for this compound.

The invention can be illustrated by the following example.

EXAMPLE

Preparation of 1-aminomethyl-4-hydroxymethylbicyclo [2.2.2]oct-2-ene (2)

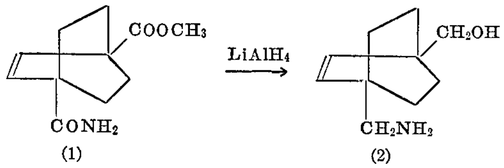

To 1.52 g. (40 mM.) lithium aluminum hydride in 50 ml. dry tetrahydrofuran at reflux was added dropwise with stirring a solution of 1.90 g. (9.10 mM.) methyl - 4 - carboxamidobicyclo[2.2.2]oct - 2 - ene-1-carboxylate (1). After the addition was completed (1 hour period), the mixture was stirred and refluxed for 10 hours. Excess lithium aluminum hydride was decomposed by the cautious addition of water, the tetrahydrofuran removed in vacuo, and the aqueous solution basified with potassium hydroxide and extracted continuously with ether. Drying of the ether extracts with magnesium sulfate, filtration and removal of the ether in vacuo left a basic colorless viscous oil, 0.85 g. (56 percent). After removal of solvents in high vacuum, the material was used directly for N-acetylation without further purification.

Preparation of 1-acetamidomethyl-4-hydroxymethyl-bicyclo[2.2.2]oct-2-ene (3)

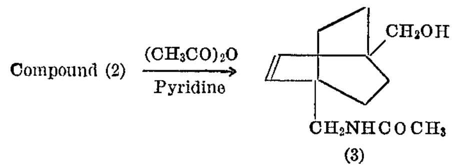

To 0.85 g. (5.10 mM.) 1 - aminomethyl - 4 - hydroxymethylbicylo[2.2.2]oct-2-ene (2) dissolved in 15 ml. dry pyridine was added over 30 minutes 0.46 g. (4.50 mM.) acetic anhydride in 10 ml. pyridine. The mixture was stirred overnight at room temperature. After removal of the pyridine in vacuo, the remaining oil was taken up in 50 ml. ethyl acetate, extracted twice with 5 ml. 3N·HCl and twice with 5 ml. saturated sodium bicarbonate, dried over magnesium sulfate, filtered and stripped to an oil which quickly solidified. Recrystallization from acetonitrile removed a trace of diacetate, giving the crystalline N-acetyl compound, M.P. 137–139° C. (594 mg., 56 percent). An infra-red spectrum showed the expected amide and hydroxyl absorptions. The NMR spectrum ($CDCl_3$) exhibited the following peaks: AB quartette centered at 1.37 p.p.m. (8 protons); singlet at 2.00 p.p.m. (3 protons, acetyl); doublet centered at 3.34 p.p.m. (J=6 cps.) (2 protons, $CH_2N$); singlet at 3.61 p.p.m. (2 protons, $CH_2O$); broad absorption centered at 5.8 p.p.m. (NH); AB quartette at 6.18 p.p.m. (J=9 cps.) (2 protons, vinyl group).

Preparation of 4-acetamidomethylbicyclo[2.2.2]oct-2-ene-1-carboxylic acid (4)

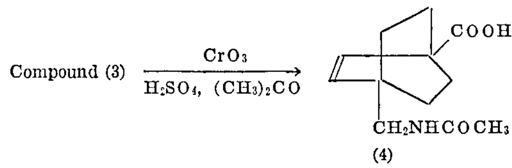

To 209 mg. (1.0 mM.) of 1-acetamidomethyl-4-hydroxymethylbicyclo[2.2.2]oct-2-ene (3) dissolved in 15 ml. acetone at 10° C. was added 0.60 ml. 2.67 molar Jones reagent in 0.10 ml. portions over a period of 15 minutes along with 30 ml. acetone, keeping the temperature between 10 and 15° C. After stirring an additional 30 minutes at this temperature, 2 drops of isopropanol were added to destroy the excess oxidant. Finally, 50 ml. of water was added to dissolve the precipitated salts. After removal of the acetone in vacuo, the product was recovered by continuous extraction of the aqueous layer with ether. After drying over magnesium sulfate, evaporation of the ether left the amido acid. Recrystallization from acetonitrile gave the product as needles, M.P. 220–225° C. An NMR spectrum of the material exhibited the following absorptions ($CF_3COOH$): Complex multiplet, 1.2–2.2 p.p.m. (8 protons, ring); singlet, 2.58 p.p.m. (3 protons, acetyl); doublet 3.73 p.p.m. (J=6 cps.) (2 protons, $CH_2N$); AB quartette 6.47 p.p.m. (J=8.5 cps.) (2 protons, vinyl); broad singlet at 8.7 p.p.m. (1 proton, NH).

Preparation of 4-aminomethylbicyclo[2.2.2]oct-2-ene-1-carboxylic acid (5)

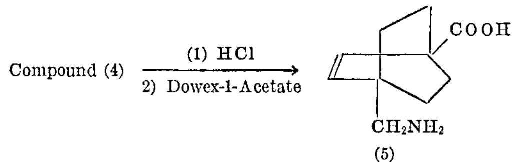

To 183 mg. (0.82 mM.) of 4-acetamidomethylbicyclo[2.2.2]oct-2-ene-1-carboxylic acid (4) was added 20 ml. of ethanol and 40 ml. 6 N hydrochloric acid. After refluxing overnight, evaporation in vacuo left the crude amino acid hydrochloride as a white solid. Passage over Dowex-1-acetate converted the material to the free amino acid which was recrystallized from water-acetone mixtures. The pure acid (5), M.P. 269–271° C. (decomp.) proved to be homogeneous upon thin layer chromatography on silica gel in two solvent systems and was detected as a red spot with ninhydrin (3:1:1 BuOH:HOAc:$H_2O$, RF=0.7; 8:1:1 $CHCl_3$:$CH_3OH$:HOAc, RF=0.15. An NMR spectrum ($D_2O$) exhibited the expected absorptions: Complex multiplet 1.0–2.0 p.p.m. (8 protons, nucleus); singlet, 3.12 p.p.m. (2 protons, $CH_2N$); AB quartette, 6.32 p.p.m. (J=8.5 cps.) (2 protons, vinyl).

The invention also contemplates that the carboxylic ester derivatives of (5) may be prepared by direct esterification of the amino acid such as by the use of alcoholic hydrogen chloride or thionyl chloride followed by alcohol. Similarly, the alkanoyl amino derivatives of (5) are prepared by acylation of the amino acids. These esters and alkanoyl amino derivatives are to be considered as included within the scope of the compounds represented by the above structural formulae and in the appended claims.

The compound of this invention is used in the method of this invention by either oral or intravenous administration, although the oral route is preferred. The esters and amides of this class of compounds are not themselves very active in vitro but the action of enzymes in vivo may cause the slow liberation of the highly active amino acids, thus providing a prolonged availability of the drug in the body. This is important because of the tendency of these drugs to be swiftly eliminated in the urine.

The compound of this invention can be used in any pharmaceutically acceptable carrier, in the form of pills, tablets or capsules. The pharmaceutically acceptable salts (both of the amino group—such as the hydrochloride, hydrobromide, sulfate, citrate, tartrate, etc. and of the carboxy group, such as the alkali metal, alkaline earth metal, etc., salts) are readily usable, especially in injectable compositions.

What is claimed is:

1. The method of treating a pathological fibrinolytic state in mammals which involves the daily oral administration of from 1 to 20 mg./kg. of body weight of the compound:

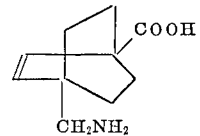

References Cited

J. Roberts et al.; JACS 75, pp. 637–40 (1953).
W. Boehme et al.; JACS 80, pp. 5488–95 (1958).

JEROME D. GOLDBERG, Primary Examiner

D. M. STEPHENS, Assistant Examiner